United States Patent [19]

Takahashi

[11] Patent Number: 4,469,930
[45] Date of Patent: Sep. 4, 1984

[54] THREE-DIMENSIONAL LASER CUTTING SYSTEM BY A PLAYBACK METHOD

[75] Inventor: Toshio Takahashi, Shizuoka, Japan

[73] Assignee: Fuji Tool & Die Co., Ltd., Shizuoka, Japan

[21] Appl. No.: 396,693

[22] Filed: Jul. 9, 1982

[30] Foreign Application Priority Data

Jul. 17, 1981 [JP] Japan .................. 56-112627
Oct. 12, 1981 [JP] Japan .................. 56-162300
Jan. 22, 1982 [JP] Japan .................... 57-9238

[51] Int. Cl.³ ............................................. B23K 27/00
[52] U.S. Cl. ...................... 219/121 LN; 219/121 LG;
219/121 FS; 318/568; 364/193; 364/475;
409/80
[58] Field of Search ................. 219/121 LG, 121 LN,
219/121 LH, 121 LJ, 121 LY, 121 FS, 121 L,
121 LM; 228/7; 409/80; 364/475, 193, 191,
192; 318/578, 568

[56] References Cited

U.S. PATENT DOCUMENTS

| | | | |
|---|---|---|---|
| 3,769,488 | 10/1973 | Hasslinger ................... | 219/121 LN |
| 4,105,937 | 8/1978 | Tuda et al. ................... | 318/568 |
| 4,135,239 | 1/1979 | Hamill et al. ................. | 364/475 |
| 4,266,172 | 5/1981 | Yamazaki ..................... | 318/578 |
| 4,328,050 | 5/1982 | Ashizawa et al. ............. | 318/568 X |
| 4,402,051 | 8/1983 | Nozawa et al. ............... | 364/475 |
| 4,412,295 | 10/1983 | Imazeki et al. ................ | 318/578 X |

FOREIGN PATENT DOCUMENTS

2743544 3/1979 Fed. Rep. of Germany ...... 219/121 LN
52-69091 6/1977 Japan ........................... 219/121 LH Primary Examiner—C. L. Albritton
Attorney, Agent, or Firm—Michael J. Striker

[57] ABSTRACT

A three-dimensional laser cutting system by a playback method, adapted to cut work pieces by means of a laser beam. The system comprises a three-dimensional drive machine provided on its main head with a laser head, high speed spindle head and tracer head; a laser unit disposed beside said machine; laser beam delivery means for guiding a laser beam from said laser unit to a laser beam emission nozzle of said laser head; and a computer having a CNC function of driving said tracer head on the basis of a two-dimensional NC tape, and a CTC function of preparing a three-dimensional NC tape on the basis of said two-dimensional NC tape and data obtained by scanning and driving said laser head by a playback method on the basis of said three-dimensional NC tape. The system of the invention may be used for various purposes. When it is used for three-dimensional laser cutting a two-dimensional NC tape of a three-dimensional work piece is prepared, the work piece being scanned by means of said tracer head on the basis of said two-dimensional NC tape, a three-dimensional NC tape being prepared on the basis of said two-dimensional NC tape and data obtained by scanning, then the work piece being cut by means of said laser head on the basis of said three-dimensional NC tape.

7 Claims, 12 Drawing Figures

THREE-DIMENSIONAL LASER CUTTING SYSTEM BY A PLAYBACK METHOD

BACKGROUND OF THE INVENTION

1. Field of the Invention

The present invention relates to a system for cutting work pieces by means of a laser beam. More particularly, it relates to a numerical control (hereinafter referred to as "NC") laser machine for cutting work pieces on the basis of a three-dimensional profile NC program.

2. Description of the Prior Art

Three-dimentional work pieces are machined on the basis of a three-dimensional profile NC program prepared in advance. However, it is very difficult to prepare three-dimensional profile NC programs directly from design drawings, etc. Even if the programs are accurately prepared, work pieces are not necessarily machined accurately in accordance with the design drawings because of various factors. A method tried in the past comprises putting a mark (for instance a trimming line) on a work piece, model, etc. to show the position to be machined, preparing a three-dimensional profile NC program by scanning the mark by means of an industrial robot, and then machining work pieces on the basis of the program. However, because the accuracy of scanning is low at present, programs thus prepared have large errors. Therefore, the application of scanning by an industrial robot is limited to spot welding, plasma cutting, etc. which do not require accuracy.

SUMMARY OF THE INVENTION

It is an object of the present invention to provide a multipurpose machine having various functions.

It is another object of the present invention to provide a three-dimensional laser cutting system in which a two-dimensional NC tape is prepared from a two-dimensional profile relating to the directions of the x-axis and y-axis, data relating to the direction of the z-axis being obtained by scanning a work piece by means of said tape, a three dimensional profile NC tape being prepared on the basis of the two-dimensional data and said data relating to the direction of the z-axis obtained by scanning, three-dimensional data thus obtained being played back to a laser head so that the laser head cuts the three-dimensional profile of the work piece.

The present invention provides a laser and multipurpose computered numerical control (CNC) machining system which is a combination of a laser unit and a three-axis drive machine. The system employs a multipurpose machine having various functions. According to an embodiment of the invention, the machine has three sub-heads for a laser beam emission nozzle, a tracer and a high speed spindle.

The machine performs two-dimensional and three-dimensional CNC laser cutting of work pieces by means of its laser head. In the case of three-dimensional laser cutting, a two-dimensional NC tape is prepared from mylar drawings of a three-dimentional work piece or a plan view of a master model, that is, from a two-dimensional profile relating to the directions of the x-axis and the y-axis. Then, a work piece fixed on the table of the machine is scanned by relatively driving a tracer head by means of said two-dimensional NC tape in order to obtain data relating to the direction of the z-axis. A three-dimensional profile NC tape is prepared on the basis of the two-dimensional data and said data relating to the direction of the z-axis. Three-dimensional data thus obtained is played back to the laser head so that the laser head cuts the three-dimensional profile of the work piece. In this way, it is possible to obtain a reliable cut line which is very narrow (0.15 mm/mild steel t=1 mm) and it is easy to cut the work piece three-dimensionally by driving the laser head in the direction of the z-axis.

The tracer head is used for scanning a model, a template or a panel, and for preparing data on a master model. The data is put into a paper tape by means of a paper tape unit. The high speed spindle head is provided with the high speed spindle (maximum 1800 rpm) and is controlled by means of a three-dimensional NC tape prepared by a CAD/CAM system. The computer has CNC and CTC, and these systems. combine with the aforesaid three sub-heads to give various functions.

In the three-axis drive machine used in the present invention, as in a conventional planomiller, a table travels in the direction of the x-axis, a cross rail is in the direction of the y-axis, and each column is in the direction of the z-axis. A main head attached to the cross rail is adapted to be driven in any of the directions of the x-axis, y-axis and z-axis. The main head is provided on its front surface with the sub-heads for the laser beam emission nozzle, high speed spindle and tracer. These sub-heads are movable separately and in parallel with the z-axis. The laser beam emission nozzle may be replaced by a plasma cutting nozzle or a gas cutting nozzle. The high speed spindle may be provided with a tool for cutting, grooving, boring, beveling, etc.

Laser cutting will now be described. The laser beam is light of electromagnetic waves having a higher frequency than the maser beam developed in the sphere of microwaves. The laser beam is monochromatic light having a narrow spectrum width and excellent directivity. By means of a transparent lens, the laser beam can be focused on a point as small as its wavelength, and the focal point has a high energy density. Therefore, the laser beam has been used for cutting or welding cloth, wood, metal, etc.

Lasers used in recent years are large in size and give a beam having energy large enough to cut a metal plate several millimeters thick. Because the main body of such a large laser has to be fixed in a position and the end of its laser beam emission nozzle has to be kept at a certain distance (about 1 mm, for instance) from the surface of the work piece, in any conventional machine the laser beam emission nozzle is fixed in a position and the table holding the work piece is moved in the directions of the x-axis and y-axis. Therefore, the work piece has had to be a two-dimensional one like a plate, and it has been difficult to machine large and heavy work pieces efficiently.

In the present invention, the laser beam emission nozzle is adapted to move in any of the directions of the x-axis, y-axis and z-axis, and the laser beam generated by the laser is guided to the emission nozzle by two or more mirrors adapted to move in concert with the emission nozzle. Thus, the emission nozzle can be moved three-dimensionally in accordance with the shape of the work piece without the main body of the laser being moved.

When the emission nozzle is approached to a work piece such as a metal plate or a plastic plate and a laser beam is emitted therefrom onto the work piece, a portion thereof subjected to the laser beam is heated. If assist gas is blown onto the portion at the same time, the work piece is cut with a fine cut line. However, when the work piece has a steep incline with respect to the direction of the z-axis, heat generated by the emitted laser beam moves down along the incline and it may be impossible to cut the portion of the work piece subjected to the laser beam. In an embodiment of the present invention, assist gas is blown toward a point on the work piece to which the laser beam is emitted, not in the direction of emission of the laser beam, so that even the work piece having a steep incline with respect to the direction of the z-axis can be accurately cut by the laser beam.

Other and further objects, features and advantages of the present invention will be more fully understood from the following description.

DETAILED DESCRIPTION

Figure 1:
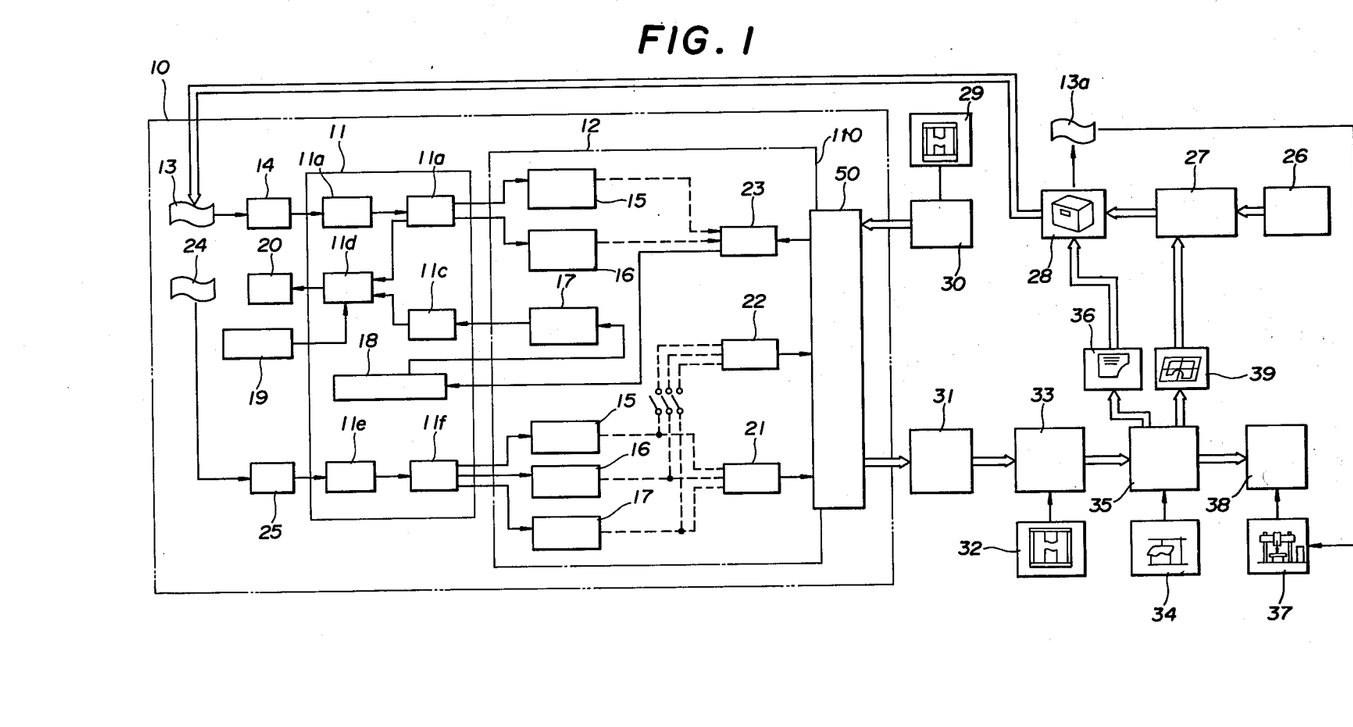
FIG. 1 is a block diagram illustrating a cutting system according to the present invention.

Referring to FIG. 1, a block diagram within a chain line shows a three-dimensional laser cutting system 10 by a playback method. The system 10 comprises a computer 11 having CNC and CTC functions, and a three-dimensional drive machine 12 such as a planomiller. The computer 11 prepares a three-dimensional NC tape 24 by combining a two-dimensional NC tape 13 with z-axis NC data obtained by a tracer. The two-dimensional NC tape 13 is put into a paper tape reader 14. The computer 11 analyzes an input therefrom by means of an analyzer 11a, separates it by means of a pulse converter 11b, and delivers two-dimensional (x-axis and y-axis) control signals which actuate x-axis and y-axis DC servometers 15 and 16 so as to drive a tracer head 23 of the machine 12. Data relating to the direction of the z-axis obtained by the tracer head 23 is sent through a tracer controller 18 and a z-axis DC servomotor 17 to the computer 11. The computer 11 processes the input from the servomotor 17 by means of a circuit 11c, analyzes the output of the circuit 11c and the output of the pulse converter 11b by means of an analyzer 11d, and performs a calculation with reference to an input prom a tolerance setting device 19. Then the three-dimensional NC tape 24 is prepared by a paper tape puncher 20. The three-dimensional NC tape 24 is put into another paper tape reader 25, and the data thereof is put into the computer 11, analyzed by means of an analyzer 11e, and separated by means of a pulse converter 11f.

Now the computer 11 delivers three-dimensional (x-axis, y-axis and z-axis) control signals which drive a laser head 21 of the machine 12 so as to cut a three-dimensional work piece 110 set on the machine table. It is needless to say that, after the trimming line of the three-dimensional work piece is scanned by the tracer head 23, the laser head 21 is shifted in parallel with the cross rail to the position where the tracter head 23 was. When an end-mill machining operation is performed in place of laser cutting, the outputs of said x-axis, y-axis and z-axis DC servomotors 15, 16 and 17 are delivered to a high speed spindle head 22.

To facilitate understanding, FIG. 1 shows the x-axis, y-axis and z-axis DC servomotors in each of the processes of preparing the two-dimensional NC tape and the three-dimensional NC tape. In reality, however, only one DC servomotor is used for each of the x-axis, y-axis and z-axis.

In the machining of a three-dimensional work piece, statement programs for definition, cutting and control are prepared on the basis of mylar drawings or a master model, said statement programs being typewritten, outputs of NC soft ware such as cutter location data being determined, a paper tape being prepared by combining said outputs with the data of a post processor, an NC tape being prepared through an NC format, and said NC tape being put into an NC machine so as to actuate DC servomotors. Such a procedure is basically applicable to the present invention.

The right portion of FIG. 1 illustrates a process of preparing a three-dimensional press die by means of the system of the present invention. Mylar drawings 26 of a product is measured by means of a digitizer 27, and measured values are put into a tape preparing device 28 to prepare a two-dimensional NC tape 13. When a master model is used in place of the mylar drawings 26, two-dimensional data thereof is obtained by means of a three-dimensional measuring device and a two-dimensional NC tape 13 is prepared from said data by means of an automatic programming device. A drawn panel 30 is made by means of a press 29, and is set on the table of the three-dimensional laser machine 12 as a work piece 110. The two-dimensional NC tape 13 is put into the paper tape reader 14 as mentioned above, the data thereof being processed by the computer 11 having CNC and CTC functions, a trimming line of the drawn panel 30 being scanned by means of the tracer head 23 to obtain data relating to the direction of the z-axis, and a three-dimensional NC tape 24 being prepared.

The three-dimensional NC tape 24 is put into the paper tape reader 25, and the data thereof is calculated by the computer 11. By a playback method, the laser head 21 is driven through the x-axis, y-axis and z-axis DC servomotors 15, 16, and 17 so as to trim the three-dimensional drawn panel 30. In this way, a trimmed sample 31 is obtained. Also, it is possible to make a partially pierced sample according to the shape of the work piece.

Then, the sample is put on another press 32 for flanging or restriking 33. The flanged or restruck sample is subjected to a panel inspection 35 by a panel inspection device 34, and is recycled through a data list 36 to the tape preparing device 28.

When the sample has passed the panel inspection 35, that is, in the case of YES, said two-dimensional NC tape 13 is converted into a two-dimensional NC tape 13a for machining by the tape preparing device 28. By means of this tape 13a, an NC machine 37 in the factory is driven to trim dies. When the sample has not passed the panel inspection 35, that is, in the case of NO, a check sheet 39 is prepared and sent to the digitizer 27 for the correction of data. The data is edited and a new NC tape is prepared to make a die which can produce desired products.

Figure 2:
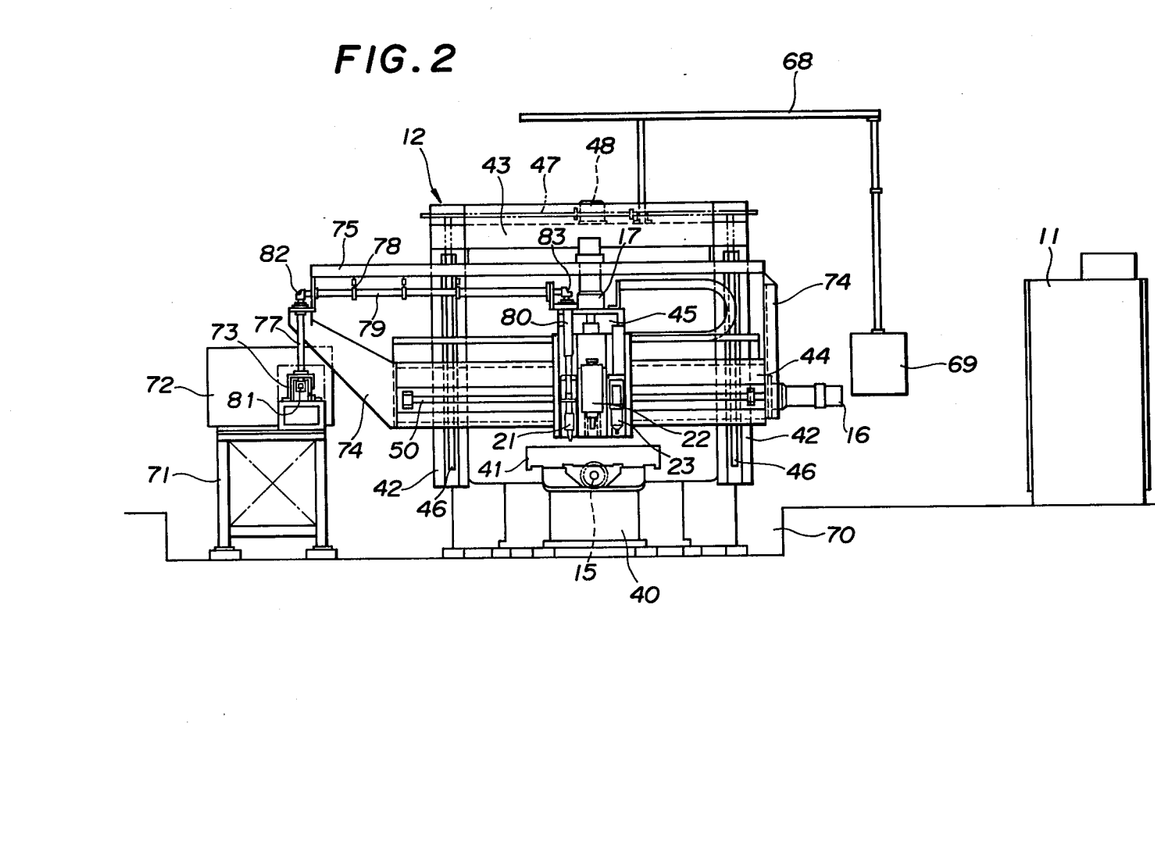
FIG. 2 is a front view of a three-axis drive laser machine used in the present invention.
Figure 3:
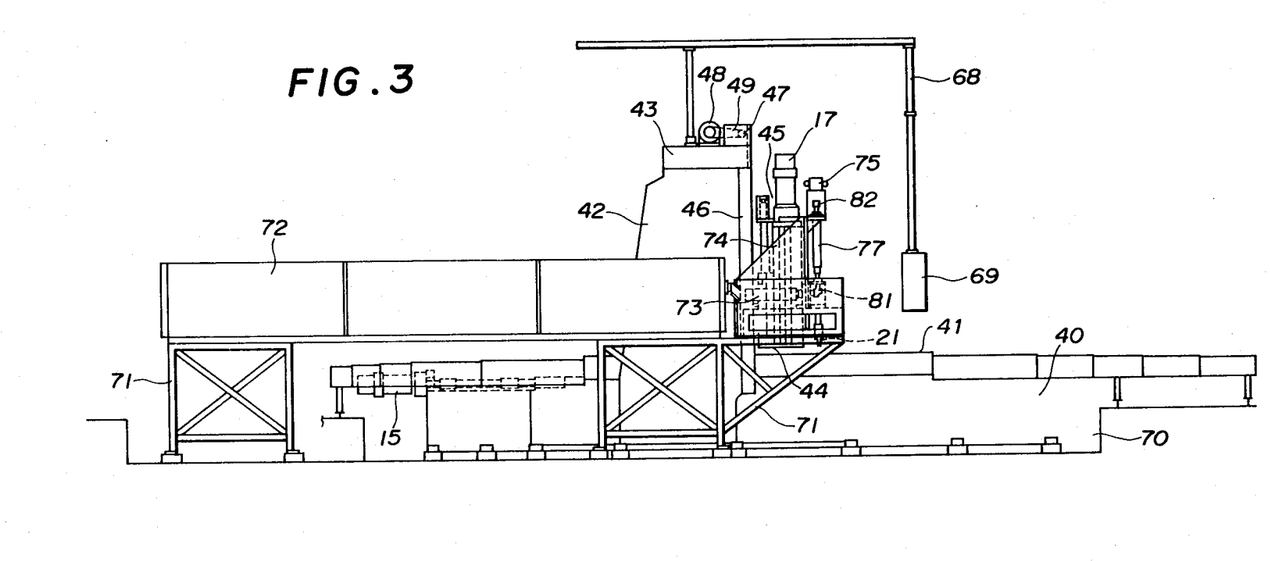
FIG. 3 is a side view of the same.

FIG. 2 is a front view of said three-dimensional laser machine 12, anf FIG. 3 is a side view thereof. This machine is a double housing planomiller. A table 41 is mounted on a bed 40, said table 41 being reciprocated longitudinally (in the direction of the x-axis) by said DC servomotor 15. A pair of vertical columns 42 are disposed on both sides of the bed 40, and a cross beam 43 is provided on top of the columns 42. A vertically movable cross rail 44 is disposed between on the front surfaces of the columns 42, and a main head 45 is attached to the cross rail 44. The main head 45 is provided on its front surface with three sub-heads consisting of the laser head 21, high speed spindle head 22 and tracer head 23.

Each of the columns 42 is provided with a vertical shaft 46. The upper end of each vertical shaft 46 is connected through bevel gears or worm gears with a horizontal shaft 47 within said cross beam 43. The cross beam 43 is provided on its top with an electric motor 48 for moving said cross rail 44 in the vertical direction (direction of the z-axis), said electric motor 48 being connected through a transmission mechanism 49 with said horizontal shaft 47. Since said vertical shafts 46 are engaged with the cross rail 44, the main head 45 can be vertically positioned by vertically moving the cross rail 44 by the operation of the electric motor 48.

Figure 4:
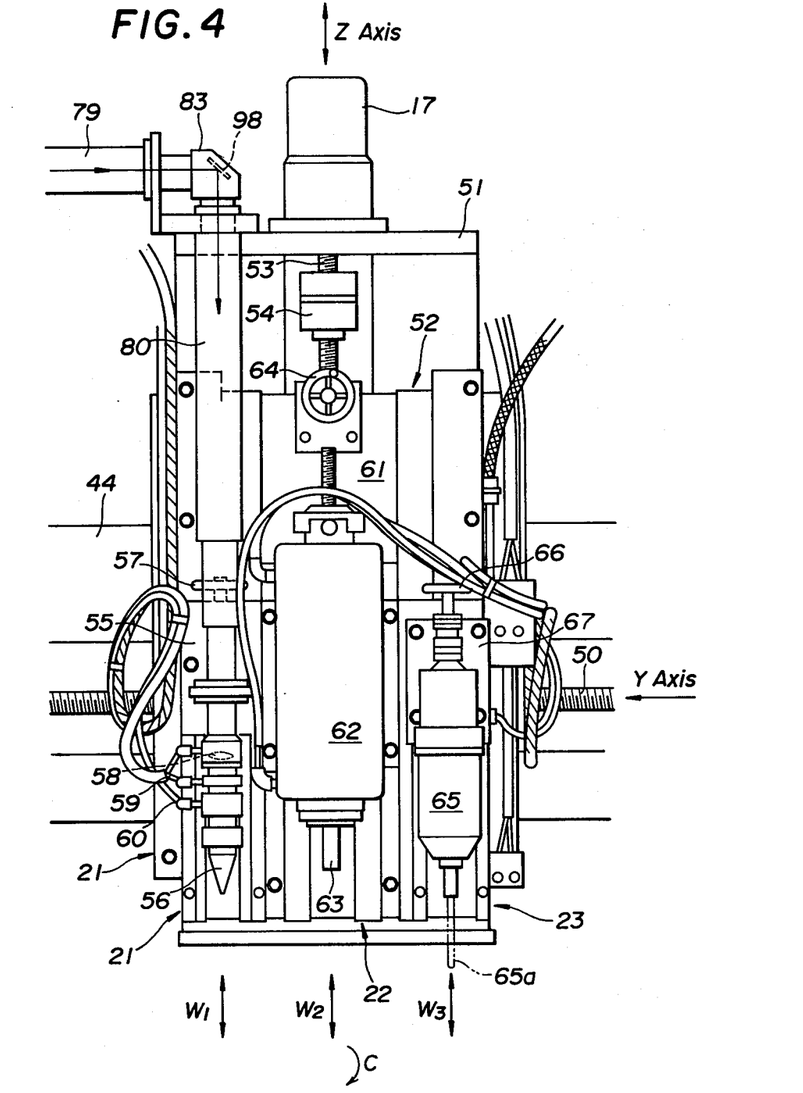
FIG. 4 is an enlarged front view illustrating a main head of said laser machine.

A cross screw 50 is horizontally disposed within said cross rail 44, and said y-axis DC servomotor 16 is attached to one end of the cross screw 50. The main head 45 can be moved in the direction of the y-axis by operating the y-axis DC servomotor 16. As shown in FIG. 4, the main head 45 includes a saddle 51, a large slide 52 and said z-axis DC servomotor 17 disposed on top of the saddle 51. When the servomotor 17 is operated, the slide 52 carrying the three sub-heads is vertically moved through a main shaft 53 and a coupling 54. The first sub-head 21 is provided on its slide 55 with a laser beam emission nozzle 56, and can be moved, by means of a handwheel 57, in the direction of a W1-axis which is parallel to the z-axis. Over the laser beam emission nozzle 56, a laser beam converging lens 58 is disposed and a cooling hose 59 and an assist gas supply pipe 60 are connected. Over the converging lens 58, a telescopic protection tube 80 is disposed which telescopes in the direction of the z-axis. The second sub-head 22 is provided on its slide 61 with an electric motor 62, a high speed spindle 63 and a handwheel 64 for moving the slide 61 in the direction of a W2-axis which is parallel to the z-axis. The high speed spindle 63 is provided at its end with a cutting tool such as an end mill or a milling cutter (not shown). The cutting tool is rotated at a high speed by the electric motor 62 so as to perform the desired machining operation of the work piece. The third sub-head 23 is provided on its slide 67 with a tracer 65, and can be moved, by means of a handwheel 66, in the direction a W3-axis which is parallel to the z-axis. The tracer 65 is provided at its end with a stylus 65a. When the tracer 65 scans a three-dimensional work piece, the vertical movements of the stylus 65a are taken as the amount of changes by means of a differential transducer, for instance, and put into said tracer controller 18.

A pendant arm 68 is attached to the upper portion of the machine, and is provided at its end with a pendant box 69 for manually operating the DC servomotors 15, 16 and 17. By manipulating push buttons of the pendant box 69, it is possible to manually determine the value of movement of the main head 45 in any of the directions of the x-axis, y-axis and z-axis.

As shown in FIGS. 2 and 3, the machine bed 40 is installed in a pit 70, and a frame 71 is disposed beside the bed 40 and in the pit 70. A laser unit 72 and a beam enhancer 73 are mounted on the frame 71. The laser unit 72 emits a $CO_2$ laser beam, for instance, and has a power range of 100 to 400 w. Brackets 74 are secured to the front portions of the machine columns 42, and a bridge 75 is mounted between the tops of the brackets 74. The bridge 75 supports laser beam delivery means including three protection tubes and three optical units as follows: A first telescopic protection tube 77 which telescopes in the direction parallel to the z-axis is supported between the beam enhancer 73 and the bracket 74 on the left side in FIG. 2. A second telescopic protection tube 79 which telescopes in the direction parallel to the y-axis is suspended from the bridge 75 by means of several trolleys 78. The aforesaid third telescopic protection tube 80 which telescopes in the direction parallel to the z-axis is attached to the laser head 21 in alignment therewith. A first beam optical unit 81, which comprises a reflector 98 for reflecting the laser beam from the laser unit 72 at a right angle, is disposed within the intersection between the beam enhancer 73 and the first protection tube 77. A second beam optical unit 82 is disposed at the intersection between the upper end of the first protection tube 77 and one end of the second protection tube 79. The other end of the second protection tube 79 is supported by a small braket 84 at the upper end of the main head 45, and is connected through a third beam optical unit 83 with the third protection tube 80. The reflector 98 is disposed in each beam optical unit at an angle of 45° as shown in FIG. 4. The laser beam generated by the laser unit 72 is enhanced by the beam enhancer 73, reflected by the first beam optical unit 81 into the first protection tube 77, reflected by the second beam optical unit 82 into the second protection tube 79, reflected by the third beam optical unit 83 into the third protection tube 80 provided on the main head 45, passed through the converging lens 58, and emitted from the nozzle 56.

A three-dimentional work piece 110 is trimmed by means of this machine as follows: First, the work piece 110 is set on the table 41. Data of a two-dimensional NC tape prepared on the basis of mylar drawings or a model is put into the computer 11. The main head 45 is moved to a reference point on the work piece, and the slide 67 is lowered by means of the handwheel 66 so as to bring the tracer head 23 to a suitable position. By processing the data of the two-dimensional NC tape by the computer 11, the table 41 is moved in the direction of the x-axis by means of the x-axis DC servomotor 15 and the tracer head 23 is moved along the cross rail 44 in the direction of the y-axis by means of the y-axis DC servomotor 16 so that the stylus 65a of the tracer head 23 obtains displacements in the direction of the z-axis. The signals of the displacements are put into the tracer controller 18 and the z-axis DC servomotor 17 is actuated thereby. In this way, the stylus 65a of the tracer head 23 follows the whole trimming line. The data thus obtained relating to the directions of the x-axis, y-axis and z-axis and the values set by the tolerance setting device 19 are processed by the computer 11, and a three-dimensional NC tape is prepared. Then, the tracer head 23 is lifted to its original position. The laser head 21 is moved to the position of the tracer head 23, and the laser beam emission nozzle 56 is brought to a position about 1.5 mm from the surface of the work piece by means of the handwheel 57. In this state, the machine 12 is operated three-dimensionally by the playback method by means of said three-dimensional NC tape, and the lase unit 72 is started. The laser beam generated by the laser unit 72 passes through the beam enhancer 73, beam optical units 81, 82 and 83, telescopic protection tubes 77, 79 and 80, and converging lens 58, and is emitted from the emission nozzle 56. Thus, the laser beam cuts the work piece along the line scanned by the tracer. After the end of the trimming, the emission nozzle 56 is moved back to its original position by means of the handwheel 57.

Figure 7:
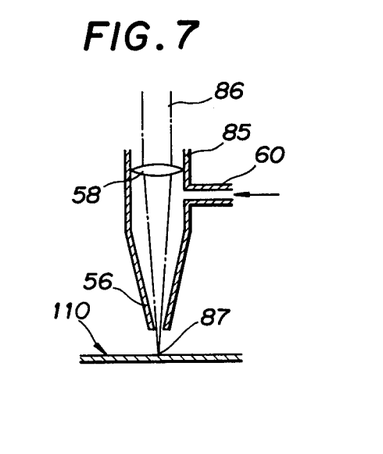
FIG. 7 is an enlarged sectional view of a laser beam emission nozzle used in the present invention.

As shown in FIG. 7, said converging lens 58 is contained within the casing 85 of the laser beam emission nozzle 56, and said assist gas supply pipe 60 is connected thereunder to the casing 85. When the emission nozzle 56 is approached to the work piece 110 and the laser beam 86 and assist gas are emitted therefrom, an point 87 on which the laser beam 86 is focused is melted and cut by the combined action of the laser beam 86 and assist gas. While the work piece 110 shown in FIG. 7 is horizontal, a three-dimensional work piece has inclines in the direction of the z-axis. If the angle of an incline exceeds 45°, for instance, heat generated by the laser beam 86 moves downward along the incline, and therefore the temperature of the point 87 may not increase to the melting point of the material.

Figure 8:
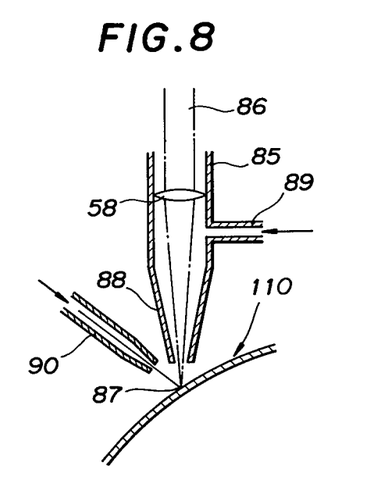
FIG. 8 is an enlarged sectional view of a modified laser beam emission nozzle used in the present invention.

In an example shown in FIG. 8, a work piece inclined with respect to the direction of emission of the laser beam 86 can be cut as accurately as a work piece at right angles therewith. While in FIG. 7 assist gas is emitted in the very same direction as the laser beam so as to overlap therewith, in FIG. 8 the assist gas is emitted toward the point 87 on the work piece 110 from the direction approximately perpendicular thereto and different from the direction of emission of the laser beam. In FIG. 8, the casing 85 of a laser beam emission nozzle 88 contains said converging lens 58 and has a gas supply pipe 89 thereunder. An assist gas emission nozzle 90, separate from the casing 85, is disposed, which nozzle emits assist gas toward the point 87 on which the laser beam 86 is focused. When the work piece 110 is cut, the laser beam emission nozzle 88 is directed to the point 87 on the work piece 110 and the assist gas emission nozzle 90 is also directed to the same point 87. Some of the assist gas blown onto the point 87 may reflect therefrom and enter the casing 85 through its opening. To prevent the assist gas from entering the casing 85, the gas supply pipe 89 sends a suitable amount of gas into the casing 85 so that it comes out of the opening and pushes back the assist gas. Thus, even if the work piece is three-dimensional and has a steep incline with respect to the direction of emission of the laser beam, the work piece can be accurately cut by blowing assist gas thereto from the direction approximately perpendicular thereto.

Figure 5:
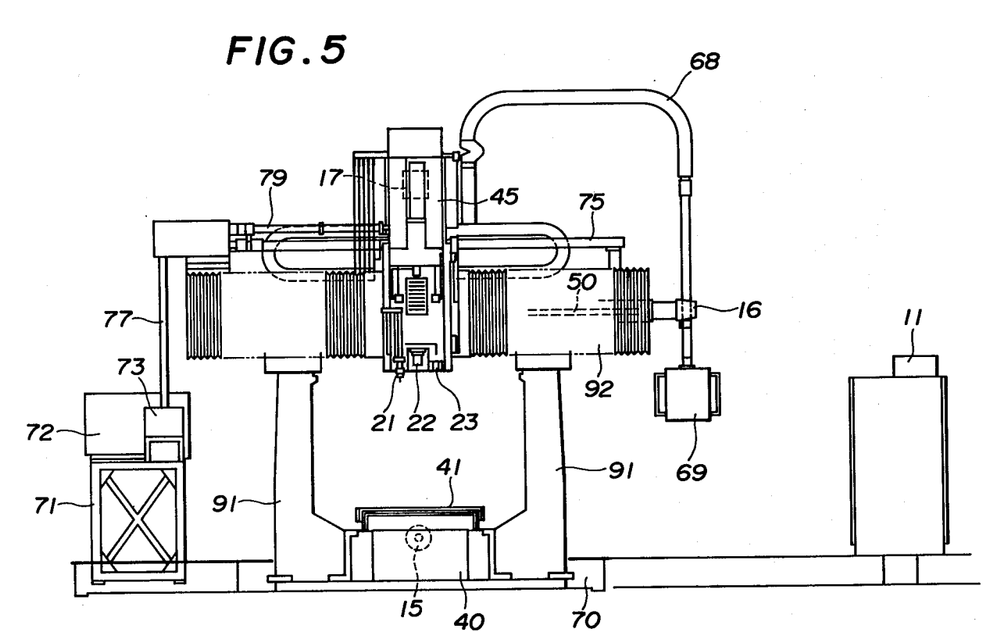
FIG. 5 is a front view illustrating a modified example of said laser machine.
Figure 6:
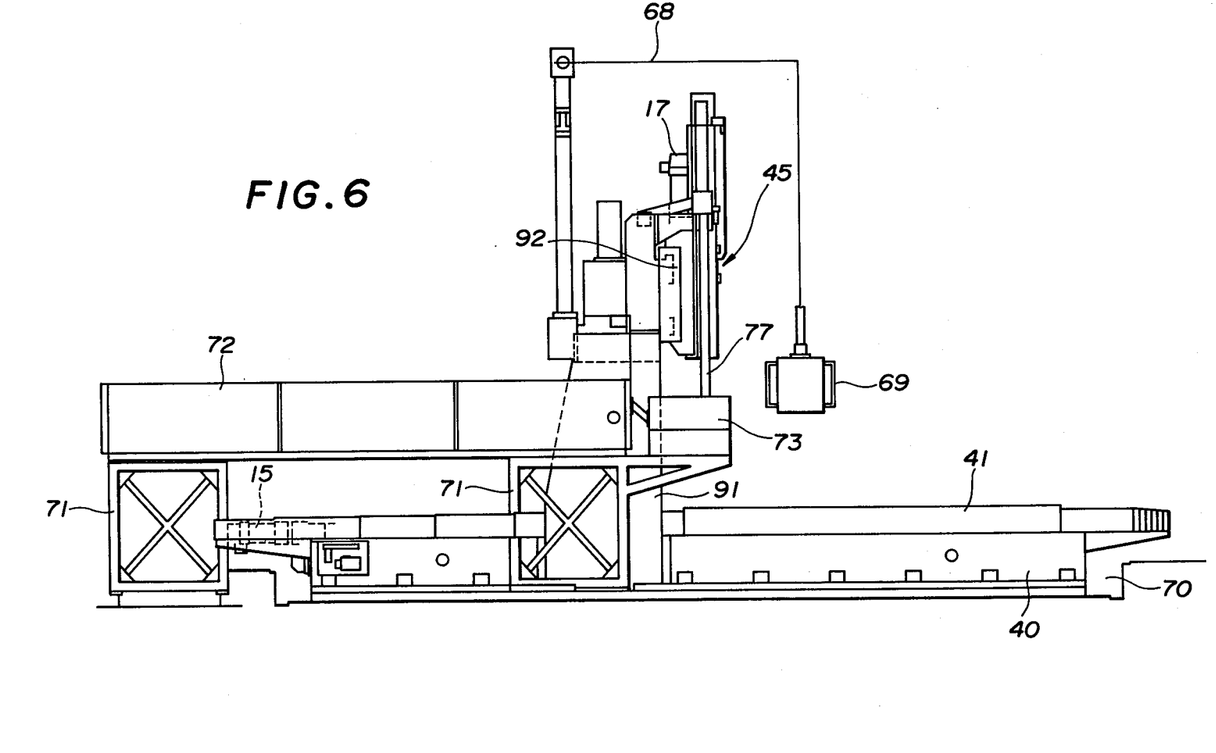
FIG. 6 is a side view thereof.

FIGS. 5 and 6 illustrate a modified example of the three-axis drive machine. The machine of this example does not have vertical shafts within its columns or an electric motor for vertically moving its cross rail. Rigid vertical columns 91 are disposed on both sides of the bed 40, and a cross rail 92 is fixed to the upper portions thereof. The cross screw 50 is horizontally disposed within the cross rail 92 so that the main head 45 can be moved in the direction of the y-axis by the operation of the y-axis DC servomotor 16. The x-axis DC servomotor 15 is disposed at the rear of the bed 40. The z-axis DC servomotor 17 is disposed at the upper rear of the main head 45, and the main head 45 has a larger stroke than that in FIGS. 2 and 3. The main head 45 has the three sub-head 21, 22 and 23 for the laser, high speed spindle and tracer. The laser beam from the laser unit 72 passes through the beam enhancer 73 and telescopic protection tubes 77, 79 and 80, and enters the emission nozzle 56 in the same manner as mentioned above. The machine shown in FIGS. 5 and 6 is less expensive to manufacture and easier to control three-dimensionally by means of the DC servomotors because the machine does not have the vertical shafts within its columns or the electric motor for vertically moving its cross rail.

Reference will now be made to the applications of the system of the present invention.

I. Cutting of Sheet Metals for a Press(Blank Cutting)

Figure 9:
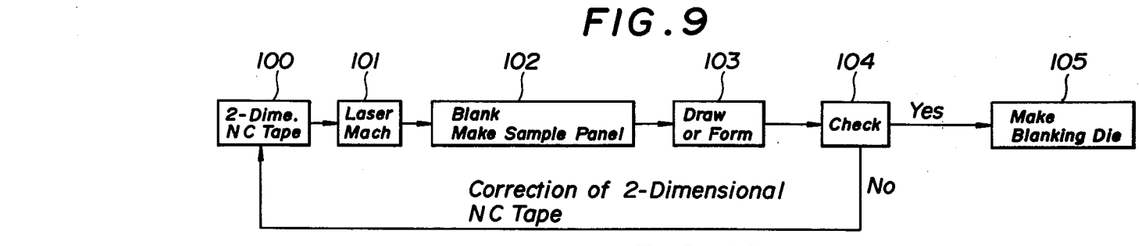
FIG. 9 is a block diagram of blank cutting at the time of making a die.

As shown in FIG. 9, a two-dimensional NC tape 100 is prepared on the basis of data theoretically calculated, and a sheet metal is cut by means of a laser machine 101. The cut sheet metal is drawn formed by means of a press 103, and then inspected by means of an inspection device 104. If its cut line after drawing or forming is found to be improper, the two-dimensional NC tape is corrected, and another sample panel is prepared by means of the laser machine 101 and the press 103. These procedures are repeated until a proper sample panel is obtained. When the proper sample panel is obtained, an NC tape for making a blanking die is prepared on the basis of the data of the NC tape used in preparing the proper sample panel. Then, a blanking die is made by means of an NC machine.

II. Confirmation and Correction of a Trimming Line

Figure 10:
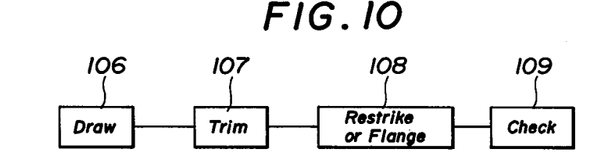
FIG. 10 is a block diagram of trimming.
Figure 11:
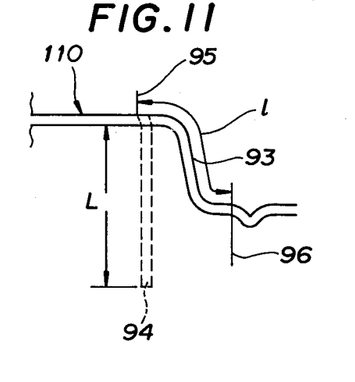
FIGS. 11 and 12 are enlarged sectional views each illustrating a drawn panel to be trimmed.

In FIG. 10, a sheet metal is drawn by means of a press 106, trimmed by means of a laser machine 107, restruck or flanged by means of another press 108, and inspected by means of an inspection device 109. In flanging, a drawn curve 93 is stretched and bent so as to form a flange 94 shown by a dotted line in FIG. 11. The distance l between a bending point 95 and a trimming line 96 must be such that the flange 94 formed by flanging after trimming has a proper length of L from the bending point 95. It is not impossible to determine such a trimming line by means of a theoretically analyzed program, but in practice it is difficult to do so.

Figure 12:
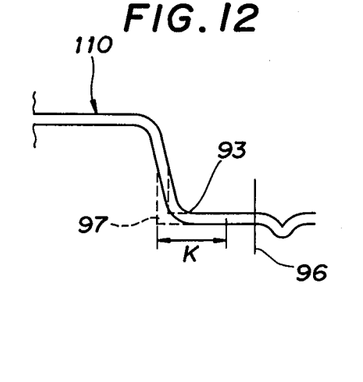

In the case of Z-bening as shown by dotted lines 97 in FIG. 12, which is performed by restriking the approximately central portion of the drawn curve 93, the trimming line 96 must be such that a flange formed by restriking has a proper length of K. However, it is very difficult to determine the trimming line 96.

Conventional means taken to obtain a proper trimming line include modifying a trimming die repeatedly and preparing sample panels by hand. However, such means require long time and much money. Such a problem can be solved by the system of the present invention.

According to the present invention, a two-dimensional NC tape 13 is prepared on the basis of theoretically calculated data, a trimming line of a sample panel being scanned by means of the tracer head 23, a three-dimensional NC tape 24 being prepared by the playback method, the sample panel being trimmed by means of the laser machine, the sample panel being subjected to a subsequent process such as flanging or restriking, then the sample panel being inspected. When the sample panel does not pass the inspection, the two-dimensional NC tape is corrected and the above-mentioned procedures are taken again. When the sample panel passes the inspection, an NC tape for making a die is prepared on the basis of the data of the three-dimensional NC tape used in trimming the last sample panel, and a trimming die is made by means of the NC tape.

It is to be noted that it is possible to scale up or down the scanned values by means of the computer, and perform laser cutting on the basis of a scaled NC tape.

III. Preparation of Metal Section Gauges and Checking Fixture Shells

It is possible to perform laser cutting of metal section gauges and checking fixture shells for three-dimensional work pieces by means of two-dimensional NC Tapes.

If no NC tape is prepared in advance,
(i) the surface of a model is scanned so as to obtain a section thereof for which a gauge is to be made, (At this time, x-z or y-z data is converted into x-y data.)
(ii) the data obtained is put into an NC tape, the amount corresponding to the radius of the stylus used for tracing being offset, and
(iii) laser cutting is performed by means of the NC tape.

IV. Measurement of Models and Automatic Preparation of Tapes (Scanning)

The surface of a model is scanned and data obtained is put into a tape.

V. NC Machining of Master Models

Master models are surfaced, contoured or profiled by means of the high speed spindle and three-dimensional or two-dimensional NC tapes prepared in advance.

VI. Preparation of Laminated Blanking Dies

VII. Trimming or Piercing of a Large Number of Pressed Panels for Test Cars

VIII. Profiling of Foamed Styrol for Full-Mold Process Casting

Foamed styrol for full-mold process casting is profiled at a desired scale by using the scaling function of the system.

The system of the present invention may be used also for various other purposes.

Thus, according to the present invention, the three-dimensional NC machine is provided on its main head with the sub-heads for the tracer, laser beam emission nozzle, high speed spindle etc., and its computer contains the playback circuit, by means of which a three-dimensional profile NC program is prepared from a two-dimensional profile NC program. The three-dimensional profile NC program is the same, concerning the directions of the x-axis and y-axis, as the original two-dimensional profile NC program and accurately corresponds to the shape of the work piece concerning the direction of the z-axis.

Therefore, three-dimensional work pieces such as press dies and trimming dies can be machined very accurately. When the three-dimensional profile NC program is prepared on the basis of a work piece, it is possible to machine the work piece immediately without moving it and therefore very high efficiency is obtained.

As many apparently widely different embodiments of the invention may be made without departing from the spirit and scope thereof, it is to be understood that the invention is not limited to the specific embodiments thereof except as defined in the appended claims.

What is claimed is:

1. A three-dimensional laser cutting system by a playback method, comprising:
   a three-dimensional drive machine having a main head movable in the directions of the x-axis, y-axis and z-axis, said main head being provided with three sub-heads consisting of a laser head, a high speed spindle head and a tracer head,
   a laser unit disposed beside said machine,
   laser beam delivery means for guiding a laser beam from said laser unit to a laser beam emission nozzle of said laser head, and
   a computer having a CNC function of driving said tracer head on the basis of a two-dimensional NC tape containing data relating to the directions of the x-axis and y-axis, and a CTC function of obtaining data relating to the direction of the z-axis by scanning a line on a three-dimensional work piece, preparing a three-dimensional NC tape on the basis of said two-dimensional NC tape and said data obtained by scanning, and driving said laser head by a playback method on the basis of said three-dimensional NC tape.

2. A three-dimensional laser cutting system by a playback method, comprising:
   a three-dimensional drive double housing planomiller having a main head movable in the directions of the x-axis, y-axis and z-axis, said main head being provided with three such-heads consisting of a laser head, high speed spindle head and a tracer head,
   a laser unit disposed beside said planomiller,
   laser beam delivery means for guiding a laser beam from said laser unit to a laser beam emission nozzle of said laser head, and
   a computer having a CNC function of controlling said tracer head so as to scan a line on a work piece on the basis of two-dimensional NC data, and a CTC function of preparing three-dimensional NC data on the basis of said two-dimensional NC data and said data obtained by scanning, and driving said laser head or high speed spindle head on the basis of said three-dimensional NC data.

3. A three-dimensional laser cutting system by a playback method as claimed in claim 1 or 2, wherein said three-dimensional drive machine comprises a table disposed on a bed so as to reciprocate longitudinally (in the direction of the x-axis), a pair of vertical columns disposed on both sides of said table, a cross rail disposed between the upper portions of said columns, a cross screw horizontally disposed within said cross rail, said main head being attached to said cross rail so as to be moved transversely (in the direction of the y-axis) by said cross screw, said main head being provided on its front surface with said three sub-heads each of which can be moved vertically (in the direction of the z-axis).

4. A three-dimensional laser cutting system by a playback method as claimed in claim 3, wherein said three-dimensional drive machine is provided at one end of said bed with an x-axis DC servomotor for moving said table longitudinally, at one end of said cross rail with a y-axis DC servomotor for moving said main head transversely, and at the top of said main head with a z-axis DC servomotor.

5. A three-dimensional laser cutting system by a playback method as claimed in claim 3, wherein said three-dimensional drive machine further comprises brackets secured to the front portions of said columns, and a bridge mounted between the tops of said brackets, said bridge supporting said laser beam delivery means.

6. A three-dimensional laser cutting system by a playback method as claimed in claim 5, wherein said laser beam delivery means comprise a first telescopic protection tube disposed in the direction of the z-axis on one side of said three-dimensional drive machine, a second telescopic protection tube suspended from said bridge in the direction of the y-axis, a third telescopic protection tube extending in the direction of the z-axis from the end of said second telescopic protection tube to said laser beam emission nozzle, a first beam optical unit disposed at the intersection between a beam enhancer of said laser unit and said first telescopic protection tube, said first beam optical unit containing a reflector, a second beam optical unit disposed at the intersection between said first telescopic protection tube and said second telescopic protection tube, and a third beam optical unit disposed at the intersection between said second telescopic protection tube and said third telescopic protection tube.

7. A three-dimensional laser cutting system by a playback method as claimed in claim 4, wherein said three-dimensional drive machine is further provided on top of a cross beam with an electric motor for vertically moving said cross rail.

* * * * *